United States Patent [19]
Ladwig et al.

[11] Patent Number: 6,047,304
[45] Date of Patent: Apr. 4, 2000

[54] METHOD AND APPARATUS FOR PERFORMING LANE ARITHMETIC TO PERFORM NETWORK PROCESSING

[75] Inventors: Geoff Ladwig, Chelmsford, Mass.; Edward S. Harriman, Cupertino, Calif.

[73] Assignee: Nortel Networks Corporation, Montreal, Canada

[21] Appl. No.: 08/902,396

[22] Filed: Jul. 29, 1997

[51] Int. Cl.$^7$ ...................................................... G06F 11/08
[52] U.S. Cl. .......................................... 708/530; 714/758
[58] Field of Search ............................... 370/252; 714/52, 714/56, 703, 712, 758, 776, 799, 807; 708/505, 603, 670–714, 530

[56] References Cited

U.S. PATENT DOCUMENTS 5,875,123   2/1999   Dao Trong et al. ................ 364/748.11

OTHER PUBLICATIONS

Memo, T. Mallory and A. Kullberg, "Incremental Updating of the Internet Checksum", BBN Communications, Network Working Group, Request for Comments: 1141, Obsoletes: RC 1071, Jan. 1990, 2 pages.

Memo, J. Touch and B. Parham, "Implementing the Internet Checksum in Hardware", ISI, Network Working Group, Request for Comments: 1936, Category: Informational, Apr. 1996, pp. 1–21.

Memo, R. Braden, D. Borman, and C. Partridge, "Computing the Internet Checksum", ISI, Cray Research and BBN Laboratories, Network Working Group, Request for Comments: 1071, Sep. 1988, pp. 1–24.

*Primary Examiner*—John A. Follensbee
*Attorney, Agent, or Firm*—Blakely, Sokoloff, Taylor & Zafman LLP

[57] ABSTRACT

A method and apparatus for processing network packets is disclosed. A Single Instruction Multiple Data (SIMD) architecture processor is disclosed. The SIMD processor includes several instructions designed specifically for the task of network packet processing. For example, SIMD add instructions for performing one's complement additions are included to quickly calculate Internet checksums. Furthermore, the SIMD processor includes several instructions for performing lane arithmetic.

25 Claims, 5 Drawing Sheets

Add DØ[63:32],DØ

Figure 5a

```
        |←————— 64 bits ——————→|
A∅ ——→ 0 |  a₀  |  b₀  |  c₀  |  d₀  |
       1 |  a₁  |  b₁  |  c₁  |  d₁  |
       2 |  a₂  |  b₂  |  c₂  |  d₂  |
       3 |  a₃  |  b₃  |  c₃  |  d₃  |
       4 |  a₄  |  b₄  |  c₄  |  d₄  |
       5 |  a₅  |  b₅  |  c₅  |  d₅  |
       6 |  a₆  |  b₆  |  c₆  |  d₆  |
       7 |  a₇  |  b₇  |  c₇  |  d₇  |
```

Figure 5b

```
    MOV            #0, D∅
ADD 16to16in1s     A∅[0], D∅      ; Start with 0
ADD 16to16in1s     A∅[1], D∅      ; Add first row
ADD 16to16in1s     A∅[2], D∅      ; Add second row......
ADD 16to16in1s     A∅[3], D∅
ADD 16to16in1s     A∅[4], D∅
ADD 16to16in1s     A∅[5], D∅
ADD 16to16in1s     A∅[6], D∅
ADD 16to16in1s     A∅[7], D∅      ; Add eight row
```

Figure 5c $D\emptyset = \boxed{a_0+a_1+a_2+a_3+a_4+a_5+a_6+a_7 \mid b_0+b_1+b_2+b_3+b_4+b_5+b_6+b_7 \mid c_0+c_1+c_2+c_3+c_4+c_5+c_6+c_7 \mid d_0+d_1+d_2+d_3+d_4+d_5+d_6+d_7}$

METHOD AND APPARATUS FOR PERFORMING LANE ARITHMETIC TO PERFORM NETWORK PROCESSING

BACKGROUND OF THE INVENTION

1. Field of Invention

The present invention relates to the field of computer networks. More specifically, the invention relates to a computer processor that has been designed with specific features for network processing.

2. Description of Related Art

To ensure the integrity of data, most communication protocols implement a checksum. To use a checksum, a sending unit calculates a first checksum based upon a data packet that will be transmitted. The sender then transmits the data packet along with the accompanying checksum to a receiving unit. The receiving unit calculates a second checksum for the received data packet. The receiver then compares the second checksum with the first checksum sent by the sending unit. If the two checksum values match, then the data packet was transmitted without error. However, when an error occurs, the two checksum values will not match and the receiving unit will reject the data packet.

Several internet protocols (e.g. UDP and TCP) use checksums to check for data corruption in data headers and/or packet bodies. The standard internet checksums use one's complement arithmetic. Several references such as Braden, R., Borman, D., and Partridge, C., "Computing the Internet Checksum," Network Working Group RFC-1071, ISI, Cray Research, and BBN Labs, September 1988; Mallory, T., and Kullberg, A., "Incremental Updating of the Internet Checksum," Network Working Group RFC-1141, BBN Comm., Jan. 1990; Plummer, W., "TCP Checksum Function Design," IEN-45, BBN, 1978, included as an appendix in RFC-1071; and Rijsinghani, A., "Computation of the Internet Checksum via Incremental Update," Network Working Group RFC-1624, Digital Equipment Corp., May 1994 teach software methods of calculating the internet checksum.

The Internet has been expanding at exponential rates. The increasing loads upon the global internet infrastructure has created a demand for very fast internet switching devices. To meet this demand, specialized hardware implementations of network processing devices have been introduced. For example, a hardware implementation of a device to calculate internet checksums is disclosed in Touch, J., and Parham, B., "Implementing the Internet Checksum in Hardware," Network Working Group RFC-1936, ISI, April 1996. Thus, there is a strong demand for high speed hardware for performing network processing.

SUMMARY OF THE INVENTION

A specialized processor for network processing is disclosed. The network processor includes several instructions that are designed to efficiently perform network processing tasks. For example, a Single Instruction Multiple Data (SIMD) one's complement add instruction is implemented to efficiently calculated the Internet checksum. Furthermore, the SIMD processor includes several instructions for performing lane arithmetic.

BRIEF DESCRIPTION OF THE DRAWINGS

FIG. 5a illustrates how a series of 16 bit values in a packet can be organized for a quick determination of an internet checksum using the present invention.

FIG. 5b illustrates a section of code that calculates partial sums for an internet checksum.

FIG. 5c illustrates a partial sum generated by the code in FIG. 5b.

DETAILED DESCRIPTION

In the following description, numerous specific details are set forth to provide a thorough understanding of the invention, for example, the teachings of the present invention are illustrated in the context of a processor for use within a network device. However, it is to be understood that the invention may be practiced without these specific details, as the present disclosure is to be considered an exemplification of the principles of the invention, and is not intended to limit the invention to that as illustrated and described herein.

Network Packet Checksums

In computer communication protocols, checksums are often used to ensure the integrity of the information transmitted. To use a checksum in computer communications, a sending unit calculates a checksum for a data packet that will be transmitted. The checksum comprises a computed value based upon the data in the packet. The sender then transmits the data packet along with the accompanying checksum across a communications channel to a receiving unit. The receiving unit calculates a new checksum for the received data packet. The receiver then compares the newly calculated checksum with the checksum received from the sending unit. If the two checksum values match, then the data packet was transmitted without error. However, when an error occurs, the two checksum values will not match and the receiving unit will reject the data packet. In some systems, the receiving unit requests the sender to re-transmit a data packet when a receiver rejects the data packet due to a checksum error.

Lane Arithmetic

The checksum algorithm described in the previous section requires a large number of addition operations to be performed. Specifically, every data byte in the data packet must be added together. To more efficiently perform this operation the present invention uses "lane arithmetic." Lane arithmetic is implemented in a microprocessor that uses a Single Instruction Multiple Data (SIMD) architecture. Specifically, the microprocessor includes instructions that perform operations on multiple data.

Figure 1:
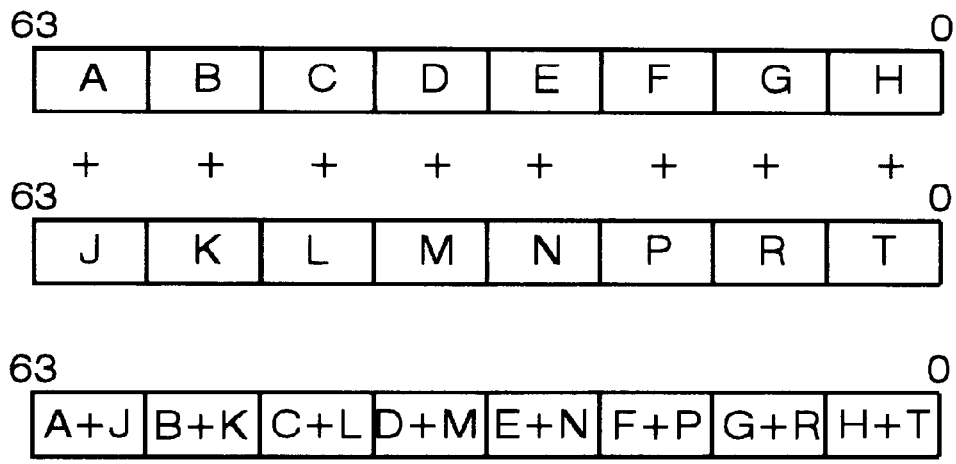
FIG. 1 illustrates an example of lane arithmetic for adding 8 bit values together using 8 lanes.

FIG. 1 illustrates a simple addition example of lane arithmetic. As illustrated in FIG. 1a first data operand is stored in a first 64 bit wide data register D1. The information in 64 bit wide data register D1 is actually eight individual bytes: A, B, C, D, E, F, G, and H. A second data operand is stored in a second 64 bit wide data register D0 that contains eight individual bytes J, K, L, M, N, P, R, and T. The first or second operand may be stored in a register or in a memory location. The lane arithmetic addition instruction adds together the eight "corresponding" bytes in each instruction. The result may stored in another register or memory location. In a preferred embodiment, the result is stored in the register or memory location that is specified as the second operand.

Figure 2:
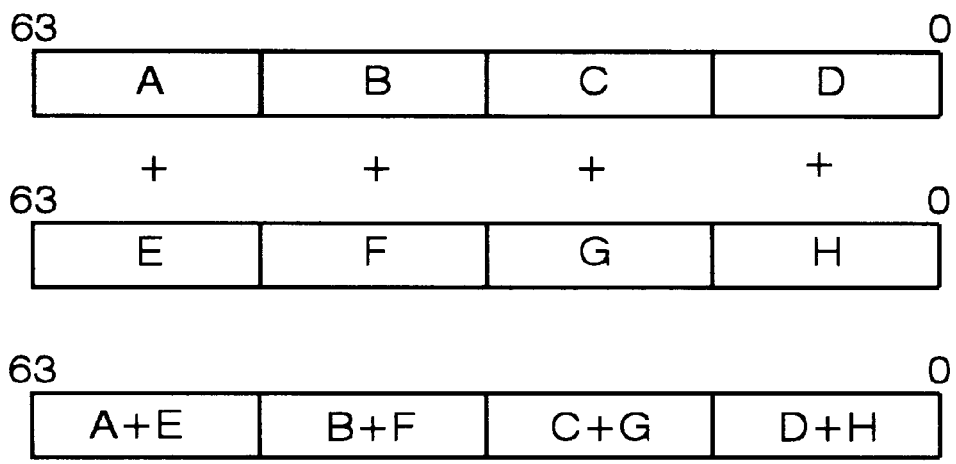
FIG. 2 illustrates an example of lane arithmetic for adding 16 bit values together using 4 lanes.

Lane arithmetic can be performed using different sized data quantities. For example, FIG. 2 illustrates a lane arithmetic addition operation that combines four individual sixteen bit quantities.

Lane Arithmetic Designed For Packet Processing

The arithmetic operations required to calculate checksums and other network packet processing is sometimes different than the arithmetic operations for other data processing. To facilitate the processing of network packets, the present invention introduces a SIMD architecture microprocessor with an instruction set designed for packet processing.

One's Complement Arithmetic

As state above, a common packet processing task is to calculate a packet checksum to ensure data integrity. For example, the data protocols of the global internet use an Internet Checksum in order to detect corruption of internet packets. The Internet Checksum is calculated by taking the complement of the ones-complement sum of the data in the packet. The data in the packet is summed together in 16-bit units. A subsequent checksum of the data and checksum together should generate a zero checksum if no errors are detected.

One's complement arithmetic is often employed in checksum operations since there is little data loss. Specifically, in a one's complement addition, any carry bit generated by addition of two 1's in the most significant bits (MSB) will wrap around to the least significant bit (LSB) of the sum. For example, in a processor with a thirty-two bit Arithmetic Logic Unit (ALU), a carry bit generated by the addition of two 1's in the 31st bit will wrap around and affect bit 0.

To efficiently perform one's complement arithmetic in checksum operations, the processor of the present invention introduces lane arithmetic instructions that perform one's complement arithmetic. In the one's complement lane arithmetic instructions, the carry bit from the MSB of each lane affects the LSB of that lane. For example, if the lanes are set up to hold sixteen bit values, a carry bit generated from bit 15 in the lane will wrap around and affect bit 0 of that lane.

Most general purpose processors do not implement one's complement arithmetic. The processor of the present invention can perform normal scalar one's complement arithmetic as well as one's complement arithmetic in lane arithmetic form. For example, the present invention implements one's complement lane addition instructions that operate as illustrated in FIG. 1 and FIG. 2.

Rotate and Add Instruction

By further analyzing the realm of network packet processing, it was determined that a single instruction that would simultaneously rotate and add several operands would greatly improve the processing efficiency. The operation of the desired "Rotate and Add" lane arithmetic instruction is graphically illustrated in FIG. 3a. The Rotate and Add lane arithmetic instruction is used when implementing the IPX and Appletalk protocols.

Figure 3:
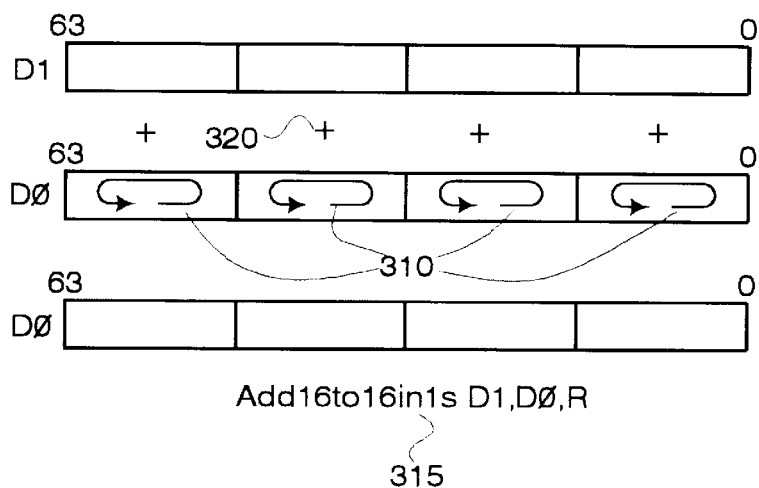
FIG. 3a illustrates a conceptual diagram of a "rotate and add" lane arithmetic instruction.
FIG. 3b illustrates a practical example of a "rotate and add" lane arithmetic instruction.

As illustrated in FIG. 3a, the individual data elements in the second operand are each rotated by a specified number of bits. The rotation may be left or right. After the rotation of the second operand is performed, then the first operand is added to the second operand. Since one's complement is often used in packet processing, the Rotate and Add instruction is available in both one's complement and two's complement forms.

FIG. 3b illustrates a real example of an "add8to8in1s D1, D0, 1" instruction. The top two register illustrations show the original contents of registers D1 and D0. The next register depiction shows how D0 appears after its contents have been rotated by one bit position (D0'). Finally, the bottom register depiction (D0") shows how the destination register appears after the contents of D1 have been added to the rotated contents of original D0.

While analyzing the realm of network packet processing, it was also determined that several varieties of "Rotate and Add" instructions be useful for packet processing. For example, the Appletalk protocol adds together eight bit data values using one's complement arithmetic to generate a sixteen bit sum. To handle this situation, the add8to16in1s instruction was created. The following table lists variations of the "Rotate and Add" instructions implemented in one embodiment of the present invention:

--- add8to8in1s    OPERAND1, OPERAND2,R;  Rotate the 8 bit quantities in the second operand by R bits and then add 8 bit quantities in the first operand using one's complement addition
add8to16in1s    OPERAND1, OPERAND2,R;  Rotate the 16 bit quantities in the second operand by R bits and then add 8 bit quantities in the first operand using one's complement addition
add16to16in1s    OPERAND1, OPERAND2,R;  Rotate the 16 bit quantities in the second operand by R bits and then add 16 bit quantities in the first operand using one's complement addition
add8to8in2s    OPERAND1, OPERAND2,R;  Rotate the 8 bit quantities in the second operand by R bits and then add 8 bit quantities in the first operand using two's complement addition
add8to16in2s    OPERAND1, OPERAND2,R;  Rotate the 16 bit quantities in the second operand by R bits and then add 8 bit quantities in the first operand using two's complement addition
add16to16in2s    OPERAND1, OPERAND2,R;  Rotate the 16 bit quantities in the second operand by R bits and then add 16 bit quantities in the first operand using two's complement addition

---

The SIMD architecture microprocessor of the present invention includes a instruction execution unit having an arithmetic logic unit (ALU) that executes the defined lane arithmetic instructions. With the defined lane arithmetic instructions, the SIMD architecture microprocessor of the present invention is ideal for performing network packet processing operations.

Bit Field Arithmetic For Packet Processing

Using the previously described Lane Arithmetic Add instructions, a series of numbers can be added together quickly. However, the end result will be a set of partial sums in a large register. To complete the sum operation, the set of partial sums must be added together. To sum the partial sums, the present invention uses Bit Field Arithmetic.

Bit field arithmetic operates by allowing a first defined bit field in a first operand to be arithmetically combined with a second operand. The operands may be stored in registers or memory locations. In one bit field arithmetic embodiment, a first defined bit field in a register is arithmetically combined with contents the same register.

Figure 4:
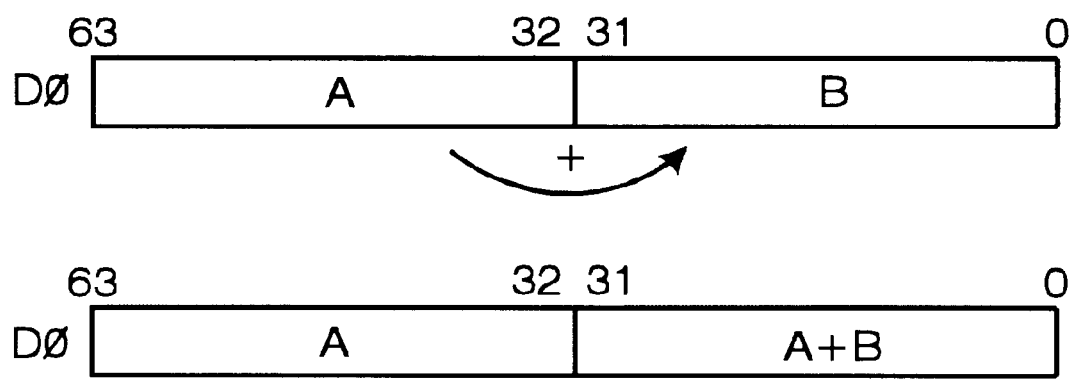
FIG. 4 illustrates a conceptual diagram of an add instruction using bit field arithmetic instruction.

For example, FIG. 4 illustrates an add operation performed using bit field arithmetic. The "add D0[63:32], D0" instruction adds the upper 32 bits (bits 32 to 63) of the D0 register to the contents of the D0 register. Thus, using this instruction two separate 32 bit values stored in the same 64 bit register can be added together. Additional information about bit field arithmetic is contained in a related patent application entitled "A Method And Apparatus For Direct Manipulation Of Bit Fields Contained In A Memory Source" having Ser. No. 08/748,603, filed Nov. 13, 1996.

Packet Processing Using Lane Arithmetic And Bit Field Arithmetic

To best illustrate how the new instructions of the present invention improve packet processing, examples of calculating the checksums using Lane Arithmetic instructions and Bit Field Arithmetic instructions are provided.

Full data packet checksum

The first example checksum calculation calculates the checksum for all the information in a data packet. The example is described with reference to FIGS. 5a, 5b, 5c, and 6.

The example checksum is calculated by taking the complement of the one's complement sum of all the data in an packet. FIG. 5a illustrates how the data from an packet consisting of thirty-two individual 16 bit words can be organized such that the calculation of the checksum is easily calculated. Specifically, FIG. 5a depicts the data arranged as thirty-two aligned sequential sixteen bit values. An address register A0 points to the beginning of the data packet for easy reference.

FIG. 5b lists the source code that will generate a one's complement partial sum of the aligned packet data. The source code first clears the D0 data register. Then, the values from the aligned packet data are sequentially added together using a series of lane arithmetic "add16to16in1s" instructions. Each add16to16in1s instruction adds four separate 16 bit values to the partial sum stored in register D0. The final result of the series of lane arithmetic add16to16in1s instructions is depicted in FIG. 5c.

Figure 6:
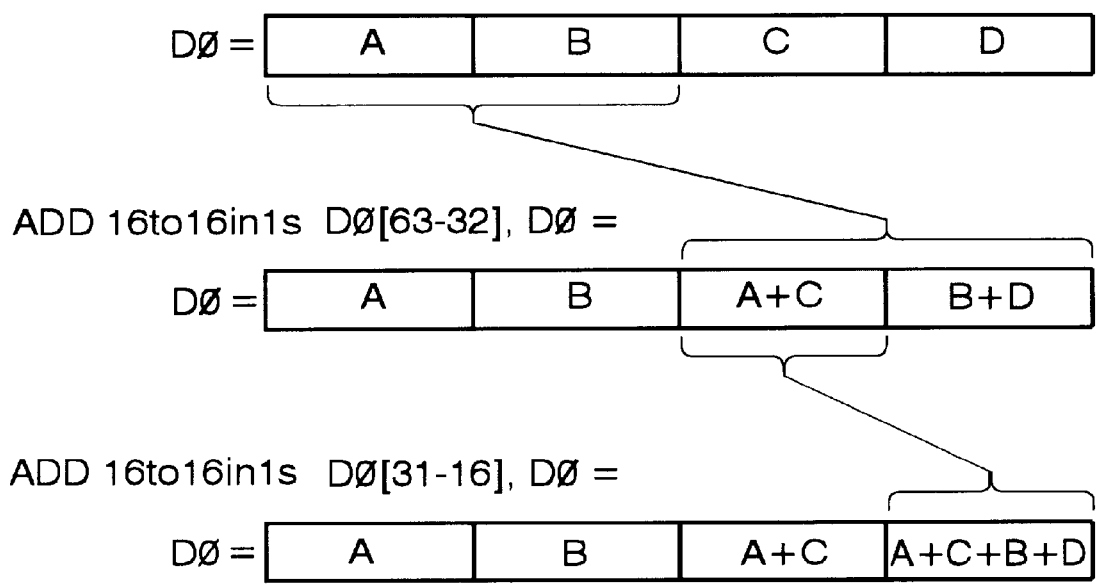
FIG. 6 illustrates how the partial sum of FIG. 5c can be combined into a final internet checksum using bit field arithmetic.

To combine the partial sums, bit field arithmetic is used. Referring to FIG. 6, the top register depiction shows the partial sums in a shorthand form wherein the individual partial sums are represented as capital letters. (i.e. A=$a_0$+$a_1$+$a_2$+$a_3$+$a_4$+$a_5$+$a_6$+$a_7$) Two bit field instructions can combine the partial sums into a final checksum value. A first bit field arithmetic instruction "add16to16in1s D0[63:32], D0" combines partial sums A and B to C and D respectively as illustrated in FIG. 6. The second bit field arithmetic instruction "add16to16in1s D0[31:16], D0" combines the partial sums A+C to B+D as illustrated in FIG. 6. Thus the final sum is represented by the lowest 16 bits of the D0 register. The other bits can be cleared using a logical AND operation. The final checksum can be generated by taking the complement of the final sum.

An Internet Protocol Version 4 Checksum

In the Internet Protocol (IP) version 4, the checksum is the one's complement of the one's complement sum of the ten 16-bit words in the Internet Protocol header. To test the Internet Protocol checksum, a one's complement sum is computed over the same ten 16-bit words in the header and added to the received IP checksum. If the result is all 1's (−0 in one's complement arithmetic) then the check is successful.

The following code implements the checksum for Internet Protocol (IP) version 4:

```
/***********************************************************/
/** Compute the IP checksum (IP version 4) **/
/***********************************************************/
/** Before entering this routine, the address register A1 **/
/** must point to the start of the IP header **/
mov            A1[0], D3           # Load first 64 bits of IP hdr
add16to16in1s  A1[1], D3           # Add in 2nd 64 bits of IP hdr
add16to16in1s  A1[2][63:32], D3    # Add in last 32 bits of IP hdr
add16to16in1s  d3[63:32], D3       # Add top lanes to bottom lanes
add16to16in1s  d3[31:16], D3       # Add 2nd lane to 1st lane
               # The final add instruction Will set a condition code
               # that can be used to direct a branch instruction
```

Referring the above code, the first instruction moves the first four 16-bit words of the IP header into the D3 data register. The second instruction adds the next four 16-bit words of the IP header to the D3 data register. The third instruction adds the final two 16-bit words of the ten word IP header to the D3 data register. The fourth instruction combines the top two lanes into the lower two lanes. Finally, the fifth instruction combines the second lane into the first lane.

As illustrated in the above computer code, a processor constructed according to the teachings of the present invention can calculate an Internet Protocol checksum in only five instructions. This computational efficiency is highly desirable for Internet routers.

While the invention has been described in terms of several embodiments, those skilled in the art will recognize that the invention is not limited to the embodiments described. The method and apparatus of the invention can be practiced with modification and alteration within the spirit and scope of the appended claims. The description is thus regarded as illustrative instead of limiting on the invention.

What is claimed is:

1. A method of calculating a sum in a processor, said method comprising:

storing a data set as a sequential series of data values in a memory, the data values being associated with lanes of data values of a selectable bit width;

sequentially adding a subset of said sequential series of data values to contents of a register using lane arithmetic to generate a sequence of partial sums within the register, the subset of said sequential series of data values are selected such that lanes of data values within the subset of said sequential series of data values are aligned and added within lanes of the register; and executing bit field arithmetic operations on the contents of the resister within the lanes in order to reduce said sequence of partial sums into a final sum within a lane of the register.

2. The method of calculating a sum as claimed in claim 1, wherein sequentially adding a subset of said sequential series of data values to a register using lane arithmetic includes, utilizing four 16 bit lanes of a 64 bit register, organizing the subset of said sequential series by selecting four separate 16 bit data values and placing them end to end in alignment with the four 16 bit lanes of the 64 bit register, and adding the bits in the respective aligned lanes together.

3. The method of calculating a sum as claimed in claim 1, wherein sequentially adding a subset of said sequential series of data values to a register using lane arithmetic includes adding by one's complement lane arithmetic so that a carry bit from each most significant bit of each respective lane affects a least significant bit of the respective lane.

4. The method of calculating a sum as claimed in claim 3, wherein said one's complement lane arithmetic further includes rotating bits within at least one lane of contents within the register prior to adding the subset of said sequential series of data values to the contents of the register using one's complement lane arithmetic.

5. The method of calculating a sum as claimed in claim 1, wherein said data set comprises an Internet Protocol header and the final sum represents a computed checksum value for comparison with a received predetermined checksum to determine if a packet associated with the received predetermined checksum was correctly received.

6. The method of calculating a sum as claimed in claim 5, wherein the final sum represents the computed checksum value in one's complement form and the comparison between the computed checksum value and the received predetermined checksum value is performed by adding the received predetermined checksum to the one's complement form of the computed checksum value and determining if the result is zero.

7. The method of calculating a sum as claimed in claim 1, wherein sequentially adding a subset of said sequential series of data values to a register using lane arithmetic includes processing an add16to16in1s lane arithmetic instruction so that sixteen bit lanes of the subset of said sequential series of data values are added to sixteen bit lanes of contents of the register using one's complement lane arithmetic addition.

8. The method of calculating a sum as claimed in claim 1, wherein sequentially adding a subset of said sequential series of data values to a register using lane arithmetic includes processing an add8to16in1s lane arithmetic instruction so that eight bit lanes of the subset of said sequential series of data values are added to sixteen bit lanes of contents of the register using one's complement lane arithmetic addition.

9. The method of calculating a sum as claimed in claim 1, wherein sequentially adding a subset of said sequential series of data values to a register using lane arithmetic includes rotating bits within at least one lane of contents within the register prior to adding the subset of said sequential series of data values to the contents of the register using lane arithmetic.

10. The method of calculating a sum as claimed in claim 1, wherein sequentially adding a subset of said sequential series of data values to the register using lane arithmetic includes performing two's complement lane arithmetic.

11. An apparatus for processing sequential instructions, said apparatus comprising:
   a register for storing bits of data;
   an instruction execution unit, said instruction execution unit including logic to receive lane arithmetic instructions and control the execution thereof; and
   an arithmetic logic unit, said arithmetic logic unit having logic to execute lane arithmetic instructions on lanes within said register, a lane being a range of bits as specified by a lane arithmetic instruction.

12. The apparatus for processing sequential instructions as claimed in claim 11 further comprises:
   bit field manipulation logic, said bit field manipulation logic to perform bit field arithmetic instructions by performing an arithmetic operation on selected fields of bits within the register as specified in a bit field arithmetic instruction.

13. The apparatus for processing sequential instructions as claimed in claim 11 wherein the logic within said arithmetic logic unit executes lane arithmetic add instructions using one's complement lane arithmetic addition.

14. The apparatus for processing sequential instructions as claimed in claim 13 wherein,
   the logic within said arithmetic logic unit may rotate bits within a lane prior to execution of a one's complement lane arithmetic addition.

15. The apparatus for processing sequential instructions as claimed in claim 11 wherein said arithmetic logic unit processes an add16to16in1s lane arithmetic instruction causing sixteen bit lanes of data to be added to sixteen bit lanes of contents of the register using one's complement lane arithmetic addition.

16. The apparatus for processing sequential instructions as claimed in claim 11 wherein said arithmetic logic unit processes an add8to16in1s lane arithmetic instruction causing eight bit lanes of data to be added to sixteen bit lanes of contents of the register using one's complement lane arithmetic addition.

17. The apparatus for processing sequential instructions as claimed in claim 11 wherein, the logic within said arithmetic logic unit executes lane arithmetic add instructions with two's complement lane arithmetic addition.

18. The apparatus for processing sequential instructions as claimed in claim 17 wherein,
   the logic within said arithmetic logic unit may rotate bits within a lane prior to execution of a two's complement lane arithmetic addition.

19. A method of verifying that a packet of data was correctly received by a network device in a network, the packet of data including a transmitted checksum and a plurality of data words each being a lane wide of a predetermined number of bits forming a plurality of lanes, the method comprising:
   arranging the data words into a sequence of data words, the sequence of data words formed by placing lanes of data words end to end in alignment for addition in parallel together;
   adding each parallel lane of the sequence of data words together using lane arithmetic resulting in a partial sum in each lane;
   adding each partial sum together using bit field arithmetic to form a final sum representative of a calculated checksum; and
   comparing the final sum with the transmitted checksum to determine if the packet was correctly received.

20. The method of claim 19, wherein the final sum represents the calculated checksum in one's complement form and the comparison between the calculated checksum and the transmitted checksum includes adding the transmitted checksum to the one's complement form of the calculated checksum and determining if the result is zero.

21. The method of claim 19 wherein, the adding of each parallel lane of the sequence of data words together using lane arithmetic resulting in a partial sum in each lane includes performing one's complement lane arithmetic.

22. A network device having a single instruction multiple data (SIMD) processor, the network device using the SIMD processor and a received checksum to verify the correct receipt of data packets across the network, each data packet including a plurality of data values each data value being a lane wide and each lane being a plurality of bits wide, the network device comprising:
   the SIMD processor including an arithmetic logic unit and a register having a width of N lanes, the arithmetic logic unit to perform lane arithmetic or bit field arithmetic in response to a single instruction, the register to couple to the arithmetic logic unit during execution of instructions and storing the operands and the results thereof;

a processor readable storage medium; and a processor readable code recorded in the processor readable storage medium to load N data values into the N respective lanes of the register as an operand, add the next N data values in parallel to the contents within the N lanes of the register using lane arithmetic to form a partial sum in lanes of the register, add at least one lane of contents within the register to another at least one lane of contents in the register using bit field arithmetic to reduce the partial sum in lanes of the register to a final sum in a lane of the register, the final sum representative of a calculated checksum, and compare the final sum with the received checksum to verify that the data packet was correctly received.

23. The network device of claim 22, wherein, the processor readable storage medium is one or more of the set of magnetic storage medium, optical storage medium, or semiconductor storage medium.

24. The network device of claim 22, wherein, the final sum is in one's complement form and the comparison with the received checksum is performed by the processor readable code recorded in the processor readable storage medium by adding the received checksum to the one's complement form of the final sum and determining if the result is zero.

25. The network device of claim 22, wherein, the arithmetic logic unit of the SIMD processor adds the next N data values in parallel to the contents within the lanes of the register using one's complement lane arithmetic to form a partial sum in each lane of the register.

* * * * *